Patented May 4, 1937

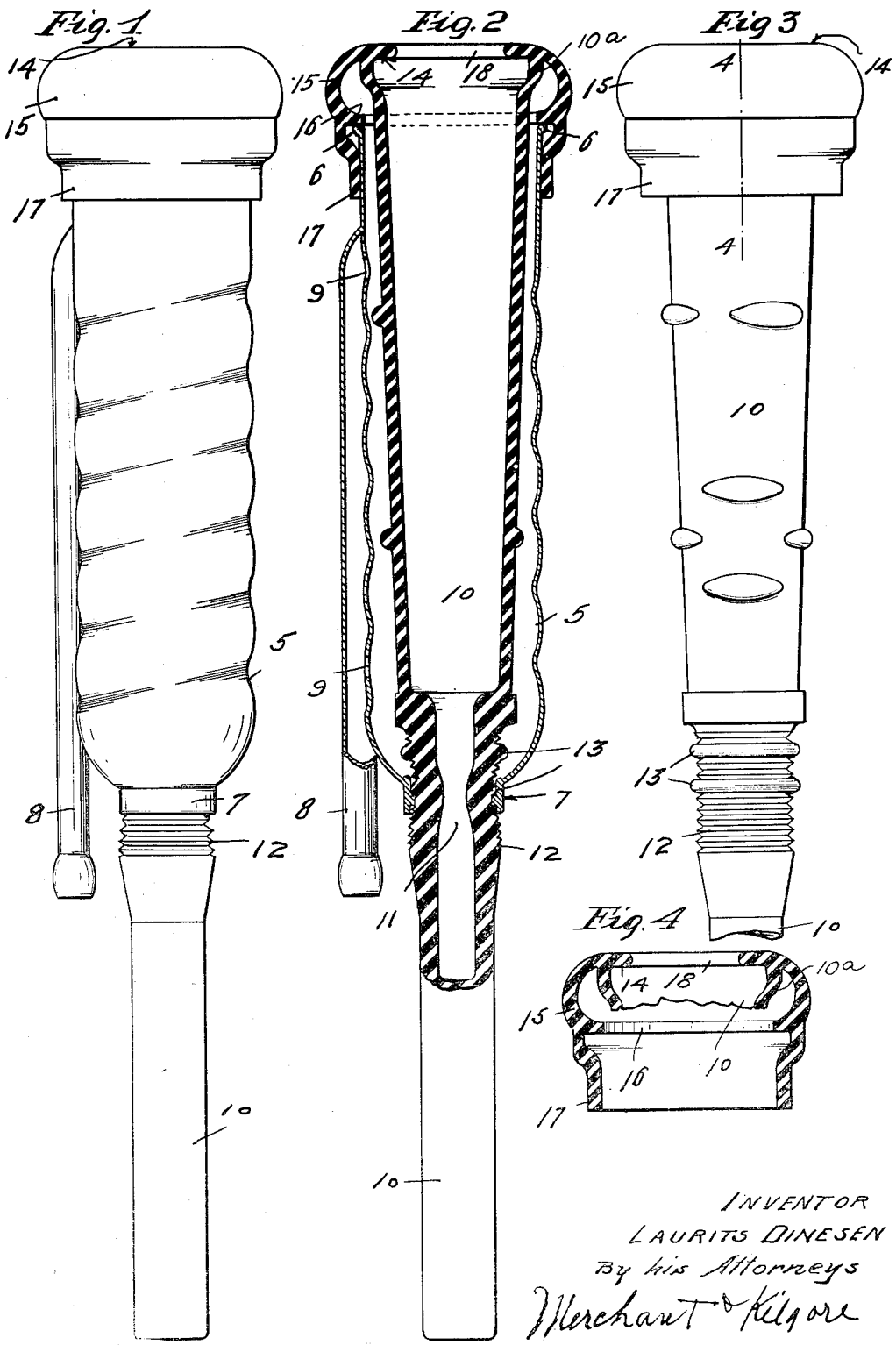

2,079,435

UNITED STATES PATENT OFFICE 2,079,435

TEAT CUP

Laurits Dinesen, Minneapolis, Minn.

Application January 2, 1936, Serial No. 57,079

6 Claims. (Cl. 31—85)

My present invention provides an extremely simple and highly efficient teat cup for use in connection with milking machines, and generally stated, it consists of the novel construction, combination and arrangement of parts, hereinafter described and defined in the claims. Particularly this invention relates to teat cups of the type generally designated as two-chambered teat cups. Teat cups of this type usually comprise a thin metal outer shell and a flexible inner wall-forming tube of rubber, the said two chambers being provided with connections whereby they will, in practice, be alternately subjected to suction or partial vacuum, thereby alternately expanding and contracting the elastic inner tube or wall.

A teat cup of the general type above stated is shown and claimed in my prior Patent No. 1,690,327 of date November 6, 1928, and entitled "Teat cup"; and the use of teat cups of the above general type is illustrated in several of my prior patents such, for example, as Patent No. 1,858,266 of date May 17, 1932, and entitled "Milking apparatus".

In the older form of teat cup above discussed, a squeezing action approximating that produced by the hand in hand milking is accomplished, but the downward pulling action which is produced by the hand has not been accomplished.

A commercial form of the improved teat cup is illustrated in the accompanying drawing, wherein like characters indicate like parts through the several views.

Referring to the drawing:

Fig. 1 is a side elevation of the complete teat cup;

Fig. 2 is an axial section of the complete teat cup, some parts being shown in full;

Fig. 3 is an elevation showing the inner tube of the teat cup removed from the outer shell; and Fig. 4 is a fragmentary section taken on the line 4—4 of Fig. 3, portions thereof being broken away.

The drawing of this application illustrates what at the present time is considered a preferred form of the invention. The metallic outer shell or casing 5 is shown as made from a thin metal tube, which, at one end, is shown as slightly outturned to form a joint rib 6, and at its other end is contracted to form an internally flanged neck 7. Extended longitudinally of and secured to the exterior of the shell 5 is a small nipple-forming metal tube 8 that has communication with the interior of the shell 5 through suitable air passages 9.

A rubber inner wall-forming tube 10 is located within the shell 5 and is the element that directly receives the teat. Thus tube 10, at its inner end, has a contracted neck 11 that is passed through and tightly fits the neck 7 of the shell 5 and serves to anchor the teat-receiving inner tube at its base end to the base or end of the shell 5. The neck 11 is shown as formed with small annular ribs 12 and with larger annular ribs 13 which serve to adjustably anchor the inner tube or teat cup proper to the shell.

As a highly important feature of the present invention, the outer end of the elastic inner tube 10 is directly connected to a rubber diaphragm 14 and this diaphragm is directly connected to a flexible outwardly and backwardly turned "accordion-acting" pleat 15 that is formed with an internal annular stop rib 16 and a further backwardly extended annular joint flange 17. The diaphragm 14 is formed with a large axial passage 18 through which the teat will be freely inserted into the inner tube, and the rim around this opening will, of course, closely engage the teat. The inner tube and the elements 14, 15, 16 and 17 are preferably all cast integral, of very resilient vulcanized rubber.

When the elements of the teat cup are assembled as best shown in Fig. 2, the joint flange 17 will be telescoped over and tightly clamped around the outer shell, and the rib end 6 of the shell will be closely engaged with the stop rib 16. It is now important to particularly note that not only the diaphragm 14 but the accordion-acting pleat 15 is outward of the end of the shell 5, and that the outer end of the inner tube is extended well beyond the outer end of said outer shell and is directly attached to the diaphragm. The great importance of this relative arrangement of parts will be made clear from the description of the operation.

It will be noted that the accordion-acting pleat 15, in axial section, is externally convex and internally concave and that its concave interior extends considerably and materially, radially outward of the line of engagement of the shell rim 6 with the stop rib 16. This feature is important for the following reason: when the annular chamber between the shell 5 and the elastic tube 10 is subjected to partial vacuum or suction, and the said tube 10 is radially expanded and axially contracted, not only the force of the downward pull of the tube 10, but the force of partial vacuum on the interior and atmospheric pressure on the exterior of the pleat 15 will cause said pleat to be collapsed axially and expanded radially, thereby facilitating the downward pull on the diaphragm 18, or otherwise stated, an upward pull on the shell 5.

Also, it is noted that the tube 10, at the point where it joins with the diaphragm 18, is outwardly expanded or bulged at 10a. This bulge 10a under the above noted action of partial vacuum or suction will bend or bulge radially outward and materially assist the radial expansion and axial collapsing of the pleat 15.

Furthermore, it is important to note that the inner rim of the diaphragm 18 projects a considerable distance inward from the bulge portion 10a so that the flange that engages the teat is given very considerable flexibility.

In practice, the milk tube and hence the interior of the flexible inner wall of the teat cup will usually be subjected more or less constantly to a light suction or partial vacuum, while the chamber within the outer shell and around the inner tube will be alternately and intermittently subjected to atmospheric pressure and to a partial vacuum that is greater than the partial vacuum to which the interior of the flexible tube is subjected. Hence, when the outer chamber of the teat cup is subjected to atmospheric pressure, the inner tube will be more or less collapsed and pressed against the teat, and when said outer chamber is subjected to partial vacuum, the walls of said inner tube will be diametrically expanded. When the walls of the tube, by partial vacuum, are thus expanded, the accordion-acting pleat will be collapsed or contracted axially of the teat cup and the diaphragm will be drawn downward in respect to the anchored lower end of said inner tube, or otherwise stated, if the diaphragm be, as it will be, anchored on the teat, then this lateral bulging and longitudinal contraction of the inner tube will have the effect of lifting the entire teat cup; and when this action takes place, it has the effect of producing a downward drawing action on the teat, which closely approximates the drawing and downward pulling action produced by the hand operation. When the outer chamber of the teat cup is subjected to atmospheric pressure and the inner tube contracted or collapsed, there will be a tendency of drawing downward on the diaphragm or lifting the teat cup, but this tendency will be offset to a very considerable extent, or possibly entirely, by the air pressure which tends to prevent the accordion-acting pleat from contracting axially of the teat cup.

It is now thought to be made apparent that the connecting of the outer end of the inner tube directly to the diaphragm and with the accordion-acting pleat or flexible connection between the diaphragm and the outer end of the outer shell is of the utmost importance in obtaining the above described combined squeezing and downward pulling action, which substantially or completely imitates the milking action produced by hand operation.

Obviously, when the interior of the inner tube is relieved from suction, at a time when the interior of said inner tube is subjected to suction or partial vacuum, the inner tube will assume its normal length or substantially that shown in Fig. 2.

The teat cup illustrated is not only more efficient in its action and more agreeable to the cow, but the rubber elements thereof may be very readily cleaned and kept in sanitary condition. Access to the interior of the flange-forming elements 15, 16 and 17 may be had by turning said flange inside out.

As a further comment, it may be stated that the outwardly bulged annular flange or accordion-acting pleat 15 is not collapsible radially of the tube, but is freely collapsible axially of the tube, so as to adapt itself to shortening and lengthening axial movements of the tube 10, due to expanding actions of the latter, and under which action, the downward and upward movements of the diaphragm are produced directly at the point of connection or junction between the inner tube and diaphragm.

In the use of these teat cups, they are connected in groups of four and under operation of the pulsator mechanism, the pulsating actions in two of the cups of the group will be alternated with the pulsating actions in the other two cups of the group, so that the group will be held in position on the teats of the cow by the action of suction or partial vacuum. However, the weight of the cups and connections will tend to keep the resilient inner tubes longitudinally stretched or full length, except when the inner tubes are collapsed and shortened in effective length as above described.

From the foregoing it will be understood that the structure illustrated in the drawing and above specifically described, is capable of various changes as to details of construction and arrangement of parts within the scope of the invention herein disclosed and intended to be broadly claimed.

What I claim is:

1. A resilient teat cup inner tube having an axially open diaphragm directly joined to its teat-receiving end, said diaphragm having an outwardly and backwardly extended flexible tubular portion forming, adjacent to the diaphragm, an outwardly expanded accordion-acting axially collapsible pleat and a tubular joint flange, and between said joint flange and pleat an inwardly projecting stop flange, the said pleat being projected materially radially outward of said stop flange and joint flange, said pleat being of such flexibility that it will expand radially and collapse axially when the exterior of the body of said tube is subjected to partial vacuum.

2. The structure defined in claim 1 in which said tube is radially expanded at its teat-receiving end, and said expanded portion joins said diaphragm radially outward of the teat-engaging rim of said diaphragm.

3. A teat cup comprising a rigid outer shell and a resilient inner tube, the latter having an axially open diaphragm directly joined to its teat-receiving end, said diaphragm having an outwardly and backwardly extended flexible tubular portion forming, adjacent to the diaphragm, an outwardly expanded accordion-acting axially collapsible pleat and a tubular joint flange, and between said joint flange and pleat an inwardly projecting stop flange, said joint flange being telescoped over said shell with its stop flange engaging the rim of said shell, the said pleat being extended materially radially outward of the stop-flange-engaging rim of said shell, said pleat being of such flexibility that it will expand radially and collapse axially, when the exterior of the body of said tube is subjected to partial vacuum produced in the space between said tube and shell, the lower portion of said tube being connected to the lower portion of said shell, by an air-tight joint, and said shell having a connection for the production of partial vacuum within the same.

4. The structure defined in claim 3 in which said tube is radially expanded at its teat-receiving end, and said expanded portion joins said diaphragm radially outward of the teat-engaging rim of said diaphragm.

5. A resilient teat cup inner tube having an axially open diaphragm directly joined to its teat-receiving end, said diaphragm having an outwardly and backwardly extended flexible tubular portion forming, adjacent to said diaphragm, an outwardly expanded accordion-acting axially collapsible pleat and a tubular joint flange, said pleat being projected materially radially outward of said joint flange, said pleat being of such flexibility that it will expand radially and collapse laterally when the exterior of the body of said tube is subjected to partial vacuum.

6. A teat cup comprising a rigid outer shell and a resilient inner tube, the latter having an axially open diaphragm directly joined to its teat-receiving end, said diaphragm having an outwardly and backwardly extended flexible tubular portion forming, adjacent to said diaphragm, an outwardly expanded accordion-acting axially collapsible pleat and a tubular joint flange, said joint flange being telescoped over said shell, but terminating short of said pleat, said pleat being extended materially radially outward of said joint flange and said pleat being of such flexibility that it will expand radially and collapse axially, when the exterior of the body of said tube is subjected to partial vacuum produced in the space between said tube and shell, the lower portion of said tube being connected to the lower portion of said shell, the lower portion of said tube being connected to the lower portion of said shell, by an air-tight joint, said shell having a connection for the production of partial vacuum within the same.

LAURITS DINESEN.